(12) United States Patent
Yeh et al.

(10) Patent No.: US 9,990,311 B2
(45) Date of Patent: Jun. 5, 2018

(54) PERIPHERAL INTERFACE CIRCUIT

(71) Applicant: ANDES TECHNOLOGY CORPORATION, Hsin-Chu (TW)

(72) Inventors: Yi-Jong Yeh, Hsinchu (TW); Chun-Chang Yu, Miaoli County (TW)

(73) Assignee: ANDES TECHNOLOGY CORPORATION, Hsin-Chu (TW)

( * ) Notice: Subject to any disclaimer, the term of this patent is extended or adjusted under 35 U.S.C. 154(b) by 240 days.

(21) Appl. No.: 14/979,607

(22) Filed: Dec. 28, 2015

(65) Prior Publication Data

US 2017/0185541 A1 Jun. 29, 2017

(51) Int. Cl.
*G06F 3/00* (2006.01)
*G06F 13/16* (2006.01)
*G06F 13/10* (2006.01)
*G06F 13/40* (2006.01)

(52) U.S. Cl.
CPC ........ *G06F 13/1605* (2013.01); *G06F 13/102* (2013.01); *G06F 13/1673* (2013.01); *G06F 13/4068* (2013.01)

(58) Field of Classification Search
CPC .... G06F 13/00; G06F 13/385; G06F 11/3055; G06F 3/0653; G06F 13/14; G06F 13/20; G06F 13/36; G06F 13/1673; G06F 13/38; G06F 13/4027; G05B 19/054; H04L 49/90

USPC .................. 710/36, 52, 53, 58, 305
See application file for complete search history.

(56) References Cited

U.S. PATENT DOCUMENTS 8,266,369 B2 * 9/2012 MacKenna ......... G06F 13/4234
711/103
2008/0313397 A1 * 12/2008 Millman ............. G06F 11/1076
711/114

* cited by examiner

*Primary Examiner* — Tim T Vo
*Assistant Examiner* — Kim T Huynh
(74) *Attorney, Agent, or Firm* — JCIPRNET

(57) ABSTRACT

A peripheral interface circuit and a peripheral memory system are provided. The peripheral interface circuit includes an interface sequencer, an input/output controller, a register unit and a data buffer. The interface sequencer receives requests from the input/output controller and accesses the peripheral memory in response to the requests. The data buffer is randomly accessed by address. If target data of the data access request exists in the data buffer, the input/output controller returns data from the data buffer in response to the request; if target data of the data access request does not exist in the data buffer, the input/output controller sends an interface request to the interface sequencer to access the peripheral memory and keeps a copy of at least the target data in the data buffer.

18 Claims, 8 Drawing Sheets

PERIPHERAL INTERFACE CIRCUIT

BACKGROUND OF THE INVENTION

1. Field of the Invention

The invention relates to an interface circuit, and particularly relates to a peripheral interface circuit for accessing a peripheral memory.

2. Description of Related Art

The growth of digital cameras, mobile phones, and MP3 players has been rapid in recent years. Consequently, the consumers' demand for storage media has increased tremendously. Since the rewritable non-volatile memory has the characteristics such as its data non-volatility, lower power consumption, smaller volume, non-mechanical structure, and fast read and write speeds, the rewritable non-volatile memory fits portable electronic products, such as laptop computers, very well. The flash drive is a portable storage device using flash memory as the storage medium. Thus, the flash memory has become an important part of the electronic industries and has been broadly used as peripheral memory.

Generally speaking, a host end connects the peripheral memory to access data through a peripheral interface circuit by adopting a suitable peripheral interface standard. Also, to facilitate a speed of accessing data, the peripheral interface circuit usually has a first-in first-out (FIFO) buffer storing pre-fetched data and having an access speed faster than that of the peripheral memory. However, if the addresses of accessed data are not continuous, some of the pre-fetched data may need to be removed from the FIFO buffer even they would be accessed in a short time. Thus, the overall data access speed is reduced. Besides, the identification of the connected peripheral memory is performed by the peripheral interface circuit in related art. In this way, the peripheral interface circuit may not recognize a new peripheral memory after it is implemented.

SUMMARY OF THE INVENTION

The invention provides a peripheral interface circuit capable of adopting different ways of accessing based on a buffer data stored thereby, a flexible method of identifying the type of connected peripheral memory, and a peripheral memory system with the peripheral interface circuit.

An embodiment of the invention provides a peripheral interface circuit. The peripheral interface circuit includes an interface sequencer, an input/output controller, a register unit and a data buffer. The interface sequencer is coupled to the peripheral memory through a peripheral interface. The input/output controller is coupled to a bus master through one or a plurality of bus interfaces. The interface sequencer is configured to receive requests from the input/output controller and access the peripheral memory in response to the requests. The input/output controller receives register access requests from the bus master and accesses the register unit in response to the register access requests. When a data access request is received from the bus master, the input/output controller determines whether target data of the data access request exist in the data buffer. The data buffer is randomly accessed by address. The register unit controls a behavior of the peripheral interface circuit or reflect a status of the peripheral interface circuit, and the data buffer keeps a copy of one or more parts of the peripheral memory.

According to an embodiment of the invention, one register of the register unit serves as a command register, and the input/output controller sends an interface request to the interface sequencer when the command register is accessed.

According to an embodiment of the invention, one or more registers of the register unit are mapped to the data buffer, and accessing the registers will access the data buffer actually.

According to an embodiment of the invention, the data buffer comprises one or more sets of a valid bit, a tag, and a data line. The valid bit indicates whether data recorded in the corresponding data line is valid. The tag records part of the address representing the first data of the corresponding data line. The data line records one or more data at continuous addresses of the peripheral memory.

According to an embodiment of the invention, if the data access request is a data read request received by the input/output controller, the data buffer is implemented as an instruction cache.

According to an embodiment of the invention, the input/output controller further receives data write requests from the bus master.

According to an embodiment of the invention, the data buffer is implemented as a data cache.

An embodiment of the invention provides a peripheral memory system. The peripheral memory system includes a peripheral interface circuit and a bus master. The peripheral interface circuit comprises an interface sequencer, an input/output controller, a register unit, and a data buffer. The bus master is coupled to the peripheral interface circuit through one or a plurality of bus interfaces. The peripheral memory is coupled to the peripheral interface circuit through a peripheral interface. The interface sequencer receives requests from the input/output controller and accesses the peripheral memory in response to the requests. The input/output controller receives register access requests from the bus master and accesses the register unit in response to the register access requests. The data buffer is randomly accessed by address. When a data access request is received from the bus master, the input/output controller determines whether the target data of the requests exist in the data buffer. The register unit comprises a plurality of registers which control the behavior of the peripheral interface circuit or reflect the status of the peripheral interface circuit. The data buffer keeps a copy of one or more parts of the peripheral memory, the bus master initiates requests to the peripheral interface circuit, and the peripheral memory stores data and receives commands from the peripheral interface circuit.

According to an embodiment of the invention, one register of the register unit serves as a command register, and the input/output controller sends an interface request to the interface sequencer when the command register is accessed.

According to an embodiment of the invention, one or more registers of the register unit are mapped to the data buffer, and accessing the registers will access the data buffer actually.

According to an embodiment of the invention, the bus master initiates requests to retrieve an identification code from the peripheral memory. The bus master determines the type of the peripheral memory according to the identification code, and requests the interface sequencer to operate at a suitable transmission mode.

Based on the above, the peripheral interface circuit in the invention contains a data buffer which stores a copy of one or more parts of a peripheral memory. When the peripheral interface circuit receives a data access request, it first checks whether the target data exists in the data buffer. If the target data exists in the data buffer, the peripheral interface circuit returns data from the data buffer in response to the request so as to increase the data access speed. If the target data does not exist in the data buffer, the peripheral interface circuit accesses the peripheral memory and keeps a copy of at least the target data in the data buffer. The efficiency of performing the data access and the speed of accessing the target data are improved.

To make the above features and advantages of the present invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
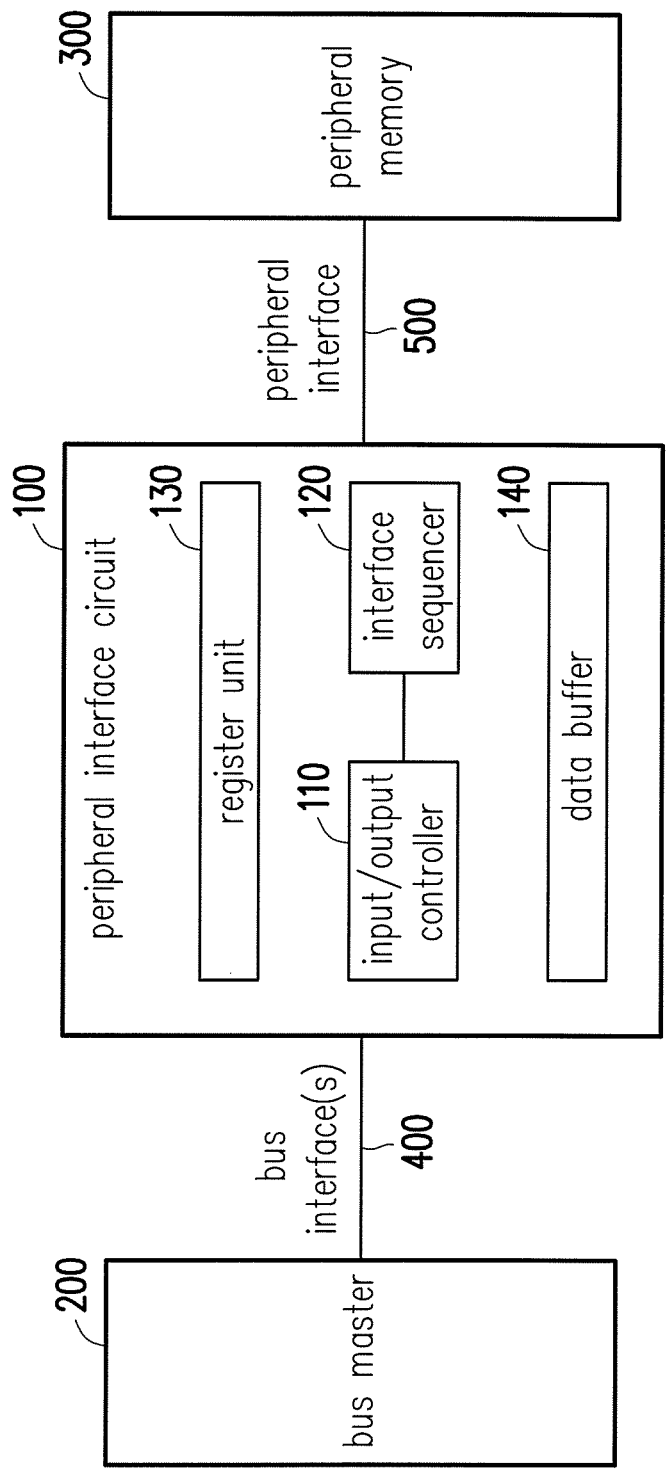
FIG. 1 is a block view illustrating a peripheral interface circuit according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

In an embodiment of the invention, a peripheral interface circuit contains a data buffer which stores a copy of one or more parts of a peripheral memory. When the peripheral interface circuit receives a data access request, it first checks whether the target data exists in the data buffer. If the target data exists in the data buffer, the peripheral interface circuit returns data from the data buffer in response to the request so as to increase the data access speed. If the target data does not exist in the data buffer, the peripheral interface circuit accesses the peripheral memory and keeps a copy of at least the target data in the data buffer. In the following, embodiments of the invention are described with references to FIGS. 1 and 2.

Figure 2:
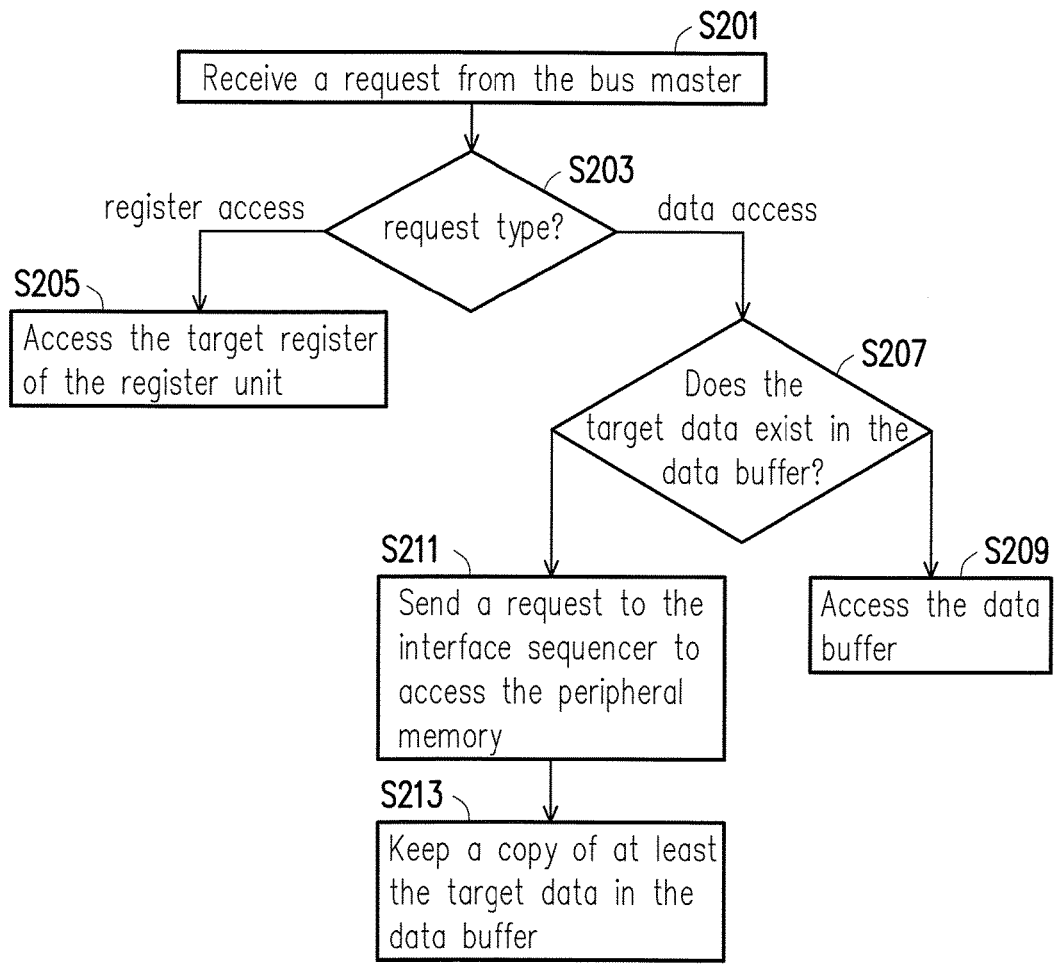
FIG. 2 is a flowchart illustrating an operation of a peripheral interface circuit according to an embodiment of the invention.

FIG. 1 is a block view illustrating a peripheral interface circuit according to an embodiment of the invention. FIG. 2 is a flowchart illustrating an operation of a peripheral interface circuit according to an embodiment of the invention. Referring to FIGS. 1 and 2 together, in this embodiment, a peripheral interface circuit 100 includes an input/output controller 110, an interface sequencer 120, a register unit 130 and a data buffer 140. The interface sequencer 120 is coupled to a peripheral memory 300 through a peripheral interface 500. The input/output controller 110 is coupled to a bus master 200 through one or more bus interfaces 400. The data buffer 140 is randomly accessed by address.

In this exemplary embodiment, the bus master 200 is a hardware component (e.g., a chipset, a processor, etc.) having a computing capability. The bus master 200 may be a central processing unit (CPU), a micro-processor, or the other programmable processing unit, digital signal processor (DSP), programmable controller, application specific integrated circuit (ASIC), programmable logic device (PLD), or the other similar device. Also, in another embodiment, the bus master 200 may also be a direct memory access (DMA) controller, and may then access the data of the peripheral memory 300 through the peripheral interface circuit 100.

In this embodiment, the bus interface 400 is a bus interface compatible with a plurality of standards. Also, based on a design of a manufacturer, the peripheral interface circuit 100 may be connected to the bus master 200 through one or more bus interfaces 400. The standards that the bus interface 400 is compatible with include the advanced peripheral bus (APB) standard, the advanced high-performance bus (AHB) standard, and the advanced extensible interface (AXI) standard, or the local memory interface (LMI) standard. However, it should be understood that the invention is not limited thereto. The bus interface 400 may also be compatible with the peripheral component interconnect (PCI) standard, the peripheral component interconnect express (PCI Express) standard, the serial advanced technology attachment (SATA) standard, the integrated device electronics (IDE) standard, or other suitable standards.

In this embodiment, the peripheral interface 500 is compatible with a plurality of standards. Also, based on a type of the peripheral memory, the interface sequencer 120 may be connected with the peripheral memory 300 through the corresponding peripheral interface 500. The standards that the peripheral interface 500 is compatible with include the inter-integrated circuit (I²C) standard, the serial peripheral interface (SPI) standard, or the hyper bus standard. However, it should be understood that the embodiments of the invention are not limited thereto. The peripheral interface 500 may also be compatible with the Institute of Electrical and Electronic Engineers (IEEE) 1394 standard, the universal serial bus (USB) standard, or other suitable standards.

The peripheral memory 300 is configured to store data. In general, the storage size of the peripheral memory 300 may be smaller than the memory space allocated for the peripheral interface circuit 100. The peripheral memory 300 may be a non-volatile memory device. For example, the peripheral memory 300 may be a flash memory or an electrically-erasable programmable read-only memory (EEPROM), etc. The peripheral memory 300 may also be a volatile memory. For example, the peripheral memory 300 may be a static random accessory memory (SRAM) or a dynamic random access memory (DRAM), etc.

The interface sequencer 120 is configured to receive requests from the input/output controller 110. After receiving a request, the interface sequencer 120 may use a suitable sequence to access the peripheral memory 300 based on the standard of the peripheral interface 500 between the interface sequencer 120 and the peripheral memory 300 and the parameters represented by the register unit 130.

In this embodiment, the input/output controller 110 is configured to receive requests from the bus master 200 and perform corresponding operations (S201). Two types of requests may be received from the bus master 200 by the input/output controller 110: register access requests and data access requests. The input/output controller 110 determines what types of requests is received (S203). If a register access request is received, the input/output controller 110 accesses the target register of the register unit 130 (S205). IF a data access request is received, the input/output controller 110 first checks whether the target data exists in the data buffer 140 (S207). If the target data of the data access request exists in the data buffer 140, the input/output controller 110 accesses the data buffer 140 (S209). If the target data of the data access request does not exist in the data buffer 140, the input/output controller 110 sends an interface request to the interface sequencer 120 to access the peripheral memory 300 (S211) and keeps a copy of at least the target data in the data buffer 140 (S213).

Because of the access speed of the data buffer 140 is tens or several hundred times faster than that of the peripheral memory, the speed of data access can be improved by utilizing the data buffer 140 efficiently. In the following, the concept of the embodiments of the invention is described in detail with several embodiments accompanied with the drawings.

Figure 3:
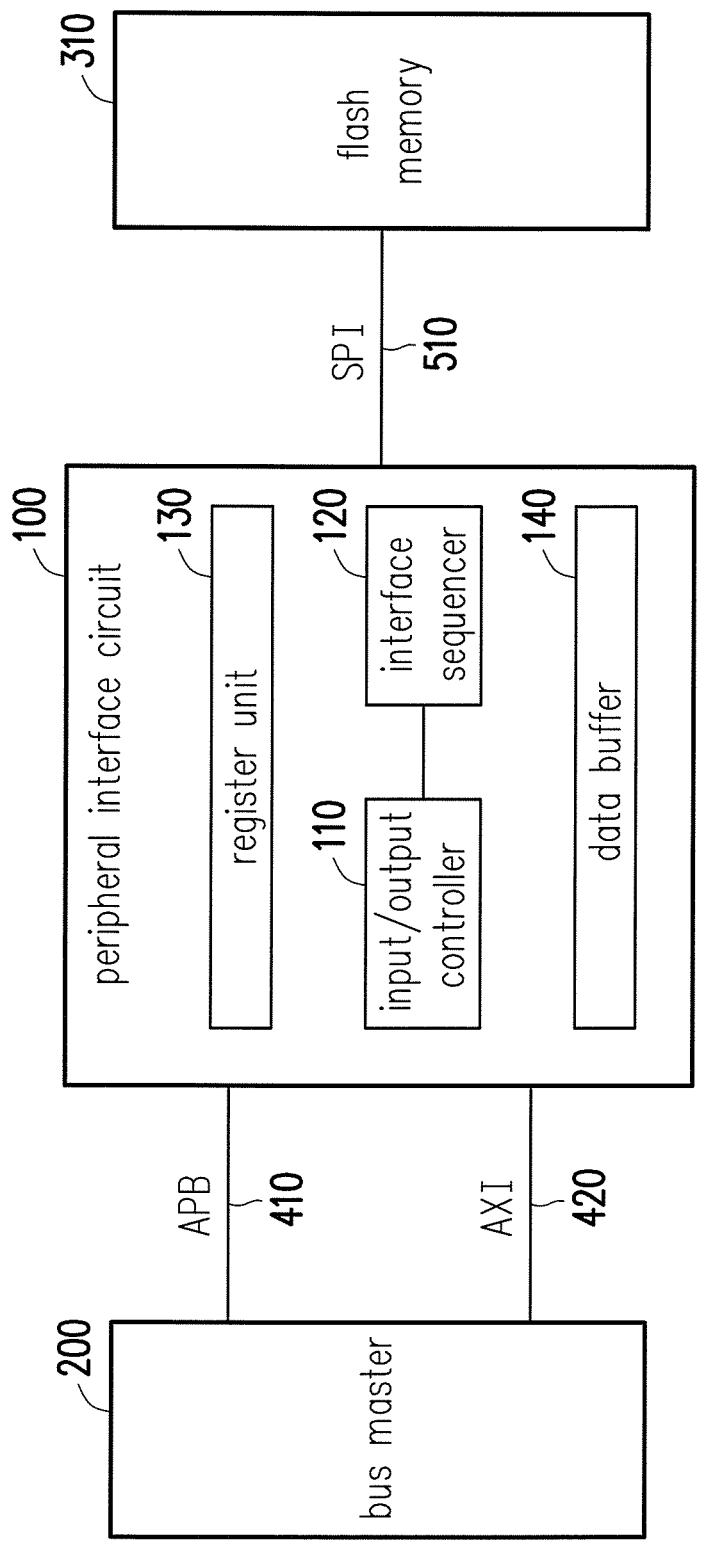
FIG. 3 is a block view illustrating a peripheral memory system according to an embodiment of the invention.

FIG. 3 is a block view illustrating a peripheral memory system according to an embodiment of the invention.

Referring to FIG. 3, in this embodiment, the peripheral memory system 10 includes a bus master 200, a peripheral interface circuit 100, and a flash memory 310. The peripheral interface circuit 100 includes an interface sequencer 120, an input/output controller 110, a register unit 130 and a data buffer 140. The input/output controller 110 may be coupled to the bus master 200 through an APB bus 410 and an AXI bus 420. The interface sequencer 120 is may be coupled to the flash memory 310 through a SPI interface 510. The data buffer 140 is randomly accessed by address.

As noted above, the interface sequencer 120 is configured to receive requests from the input/output controller 110 and access the flash memory 310 in response to the requests. For example, after receiving a data access request from the input/output controller 110, the interface sequencer 120 may convert the request into a data access sequence based on the SPI protocol, so as to access the data of the flash memory 310. In addition to data access requests, requests from the input/output controller 110 may include erase operations suitable for the flash memory 310. An erase operation serves to instruct the flash memory 310 to return partial or all of its memory elements to their initial states, so that data may be further written to the flash memory 310.

In this embodiment, the input/output controller 110 is configured to receive register access requests through the APB bus 410 to read or write the register unit 130. The register unit 130 may control the behavior or reflect the status of the interface sequencer 120. In addition, one register of the register unit 130 may serve as a command register, and the input/output controller 110 may send a request to the interface sequencer 120 when the command register is accessed. Moreover, one or more registers of the register unit 130 may be mapped to the data buffer 140 such that the bus master 200 can access the data buffer 140 by sending register access requests.

In this embodiment, the input/output controller 110 is further configured to receive data access requests through the AXI bus 420. If a data access request is received by the input/output controller 110, the input/output controller 110 first checks whether the target data indicated by the data access request exists in the data buffer 140. If the target data of the data access request exists in the data buffer 140, the input/output controller 110 returns data from the data buffer 140 in response to the data access request. If the target data of the data access request does not exist in the data buffer 140, the input/output controller 110 sends an interface request to the interface sequencer 120 to access the flash memory 310 and keeps a copy of at least the target data in the data buffer 140.

In this embodiment, every data access request through the AXI bus 420 is a simple memory access with a target address. Every target address is associated with a target data of the flash memory 310. If a data access request is received by the input/output controller 110, it sends a data access request with a target address to the interface sequencer 120 to access the flash memory 310.

In this embodiment, referring to FIG. 3, the bus master 200 may perform an initialization sequence to the peripheral interface circuit 100 after the power of the peripheral memory system 11 is turned on. In the initialization sequence, the bus master 200 may program the register unit 130 such that the input/output controller 110 may transmit an identification request (e.g., "Read ID" command) to the interface sequencer 120. The input/output controller 110 receives an identification code (ID) from the flash memory 310 through the interface sequencer 120 in response to the identification request. The identification code is a manufacturer ID or a device ID of the flash memory 310, for example. The bus master 200 may retrieve the identification code and determine the type of the flash memory 310. Then, the bus master 200 may program the register unit 130 such that the interface sequencer 120 can operate at a suitable data transmission mode. For example, in this embodiment, assuming that the bus master 200 identifies that the flash memory 310 supports the quad-I/O mode, the bus master 200 may program the register unit 130 such that the interface sequencer 120 may operate at the quad-I/O mode to access the flash memory 310. It should be noted that, in the initialization sequence, the interface sequencer 120 may operate at a preset data transmission mode (e.g., single mode) to communicate with the flash memory 310.

Details about interface standards used in the APB bus 410 and the AXI bus 420 are the related art technologies, and are thus not reiterated below. In the following, the data buffer 140 in FIG. 1 and FIG. 3 is described in detail with several embodiments in the following descriptions.

Figure 4:
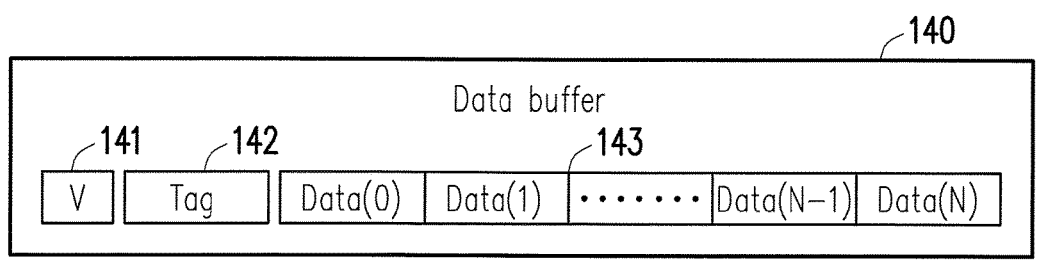
FIG. 4 is a block view illustrating a data buffer according to an embodiment of the invention.

FIG. 4 is a block view illustrating the data buffer 140 according to an embodiment of the invention. In this embodiment, the data buffer 140 includes a valid bit 141, a tag 142 and a data line 143. While the peripheral memory 300 is accessed by the input/output controller 110, it may keep a copy of at least the target data in the data buffer 140 by resetting the valid bit 141 to "0", storing the target data in Data(0) and recording the target address in the tag 142. Next, the input/output controller 110 may pre-fetch the data at the subsequent N addresses of the peripheral memory 300 and store the pre-fetched data in Data(1)~Data(N) sequentially. Then, the valid bit 141 is set to "1". Here, N is a positive integer, and the invention does not intend to limit N.

As noted above, the tag 142 stores the target address of a data access request. Actually, the tag 142 may store part of the target address, which may be determined by the size of peripheral memory 300 and the size of one data storage unit. It is assumed that the size of peripheral memory 300 is $2^r$ bytes and the size of one data storage is $2^s$ bytes, while the parameter r and s is a positive integer. Then, the tag 142 may store only bit (r-1)~bit s of the target address. For example, when the size of peripheral memory is 1 M bytes and the size of one data storage is 4 bytes, the tag 142 may record only bit 19~bit 2 of the target address.

In this embodiment, if a data access request is received by the input/output controller 110, it may determine whether the target data exists in the data buffer 140 by the target address, the valid bit 141 and the tag 142 as well as the size of peripheral memory 300 and the size of one data storage unit. It is assumed that the address of the target data is A, the content of tag 142 is T, the size of peripheral memory 300 is $2^r$ bytes and the size of one data storage unit is $2^s$ bytes. Let the address F in the data buffer 140 is formed by the following equation (1):

$$F=A[r-1:s]-T \qquad (1)$$

Then, the target data exists in the data buffer 140 if 0<=F<=N and the valid bit is 1. For example, when N is 7, the valid bit is "1", the content of tag T is 0x18C63, the size of peripheral memory is 1 M($2^{20}$) bytes (e.g., r=20), and the size of one data storage unit is 4($2^2$) bytes (s=2), the target data with the address A 0x63194 exists in the data buffer as the parameter F=A[20-1:2]−T=0x63194[19:2]−0x18C63=0x2, and the parameter F(0x2)<=7.

Figure 5:
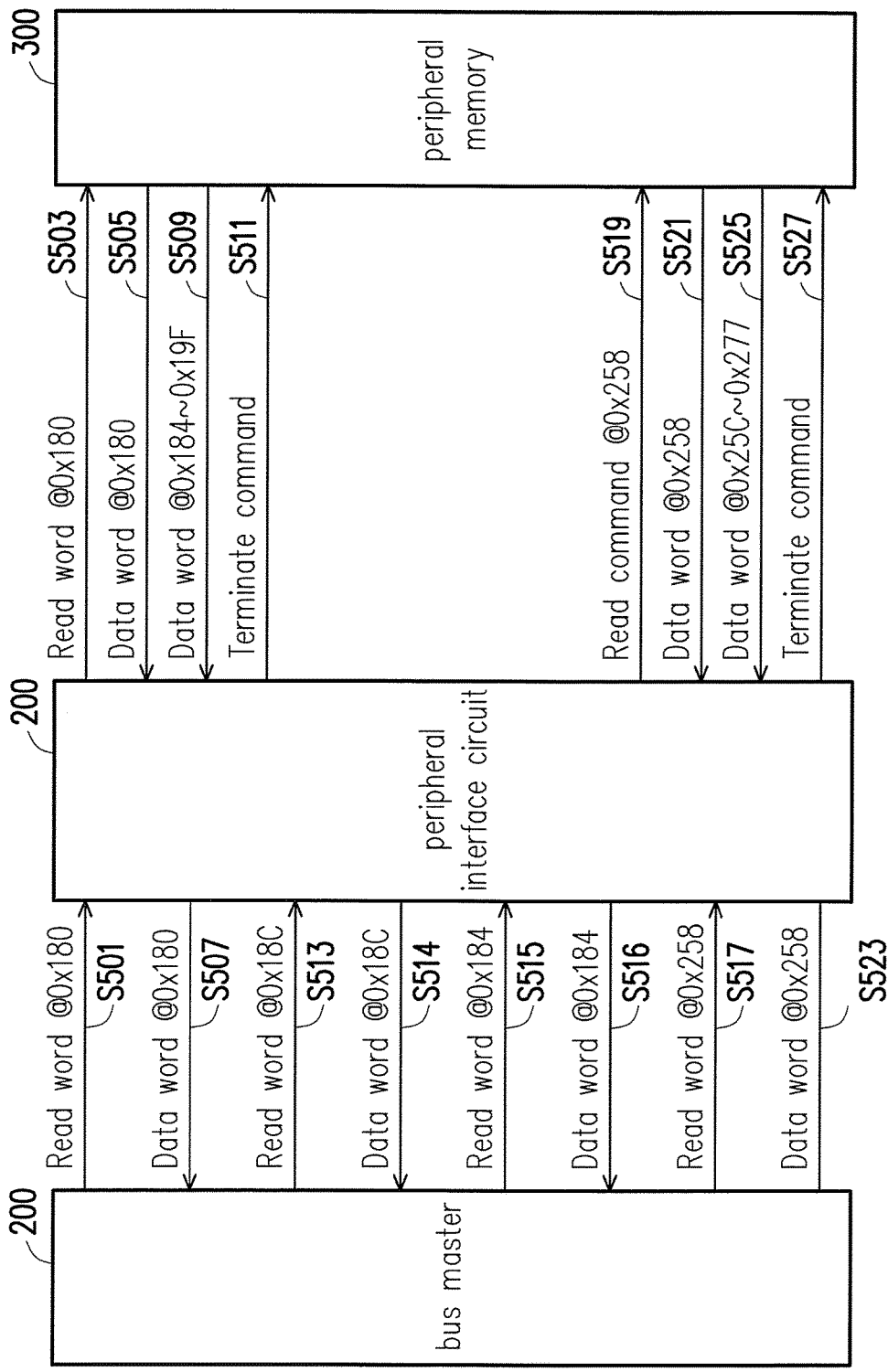
FIG. 5 is a block view illustrating the operation of a peripheral memory system according to an embodiment of the invention.

FIG. 5 is a block view illustrating the operation of a peripheral memory system 140 according to an embodiment of the invention. In other words, FIG. 5 shows a peripheral memory system 10 operating with the embodiment of data buffer 140 shown above. Referring to FIG. 4 and FIG. 5, it is assumed that the peripheral interface circuit 100 receives a data access request of read word with target address 0x180 (S501), then the peripheral interface circuit 100 sends a read command with address 0x180 to the peripheral memory 300 (S503). The peripheral interface circuit 100 receives a data word from the peripheral memory 300 (S505), and then the peripheral interface circuit 100 returns a data word in response to the data access request (S507) after receiving the data word from the peripheral memory 300. The data word is also recorded in the data buffer Data(0), and the tag 142 of FIG. 4 is updated accordingly. Next, seven data words with the subsequent addresses (0x184~0x19C) are received from the peripheral memory 300 and recorded in the data buffer Data(1)~Data(7) sequentially (S509). Then, the valid bit 141 of FIG. 4 is set to "1", and the peripheral interface circuit 100 terminates the command (S511). Next, the peripheral interface circuit 100 receives two data access requests of read word with target address 0x18C (S513) and read word with target address 0x184 (S515). The corresponding data words exist in the data buffer Data(2) and Data(1) respectively because target addresses 0x18C and 0x184 is within the subsequent addresses 0x184~0x19C, so the peripheral interface circuit 100 returns the data words from the data buffer 140 instead of accessing the peripheral memory 300 (S514, S516). If the peripheral interface circuit 100 receives a data access request of read word with target address 0x258(S517), the peripheral interface circuit 100 determines that the target data does not exist in the data buffer 140, then sends a read command with address 0x258 to the peripheral memory 300 (S519). The subsequent operations S521, S523, S525, and S527 are similar to the previous ones S505, S507, S509, and S511, so the related description is omitted here.

Figure 6:
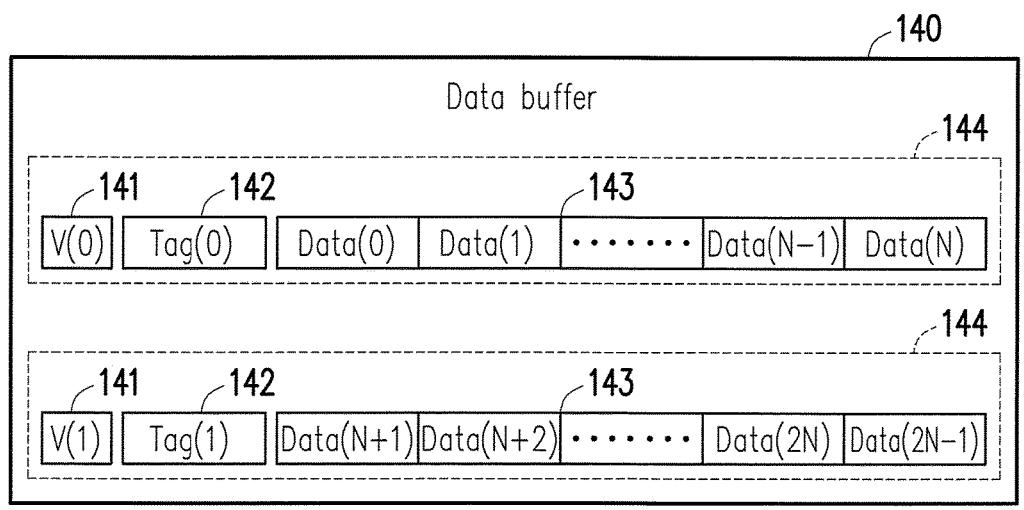
FIG. 6 is a block view illustrating a data buffer according to an embodiment of the invention.

FIG. 6 is a block view illustrating another embodiment of the data buffer 140. In this embodiment, the data buffer 140 includes two buffer sets 144 and each buffer set includes a valid bit 141, a tag 142 and a data line 143. Every buffer set works in the same way as the previous embodiment of the data buffer 140 of FIG. 4. Two buffer sets provide more buffering space and then better performance. The invention does not intend to limit the number of buffer sets for a data buffer 140.

In another embodiment, the data buffer 140 may be implemented as an instruction cache if the peripheral interface circuit 100 is configured to receive only data read requests. If the peripheral interface circuit 100 is configured to receive both data read and data write requests, the data buffer may be implemented as a data cache.

Figure 7:
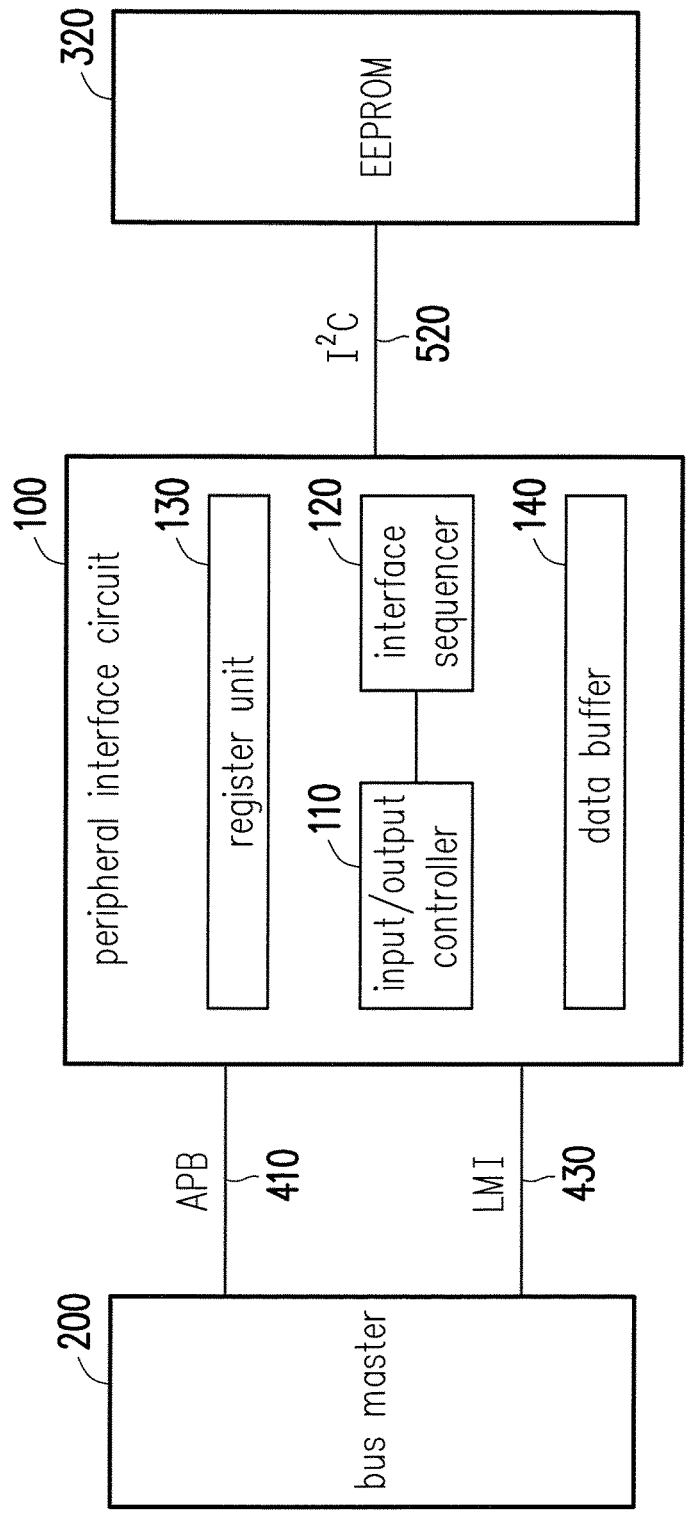
FIG. 7 is a block view illustrating a peripheral memory system according to an embodiment of the invention.
Figure 8:
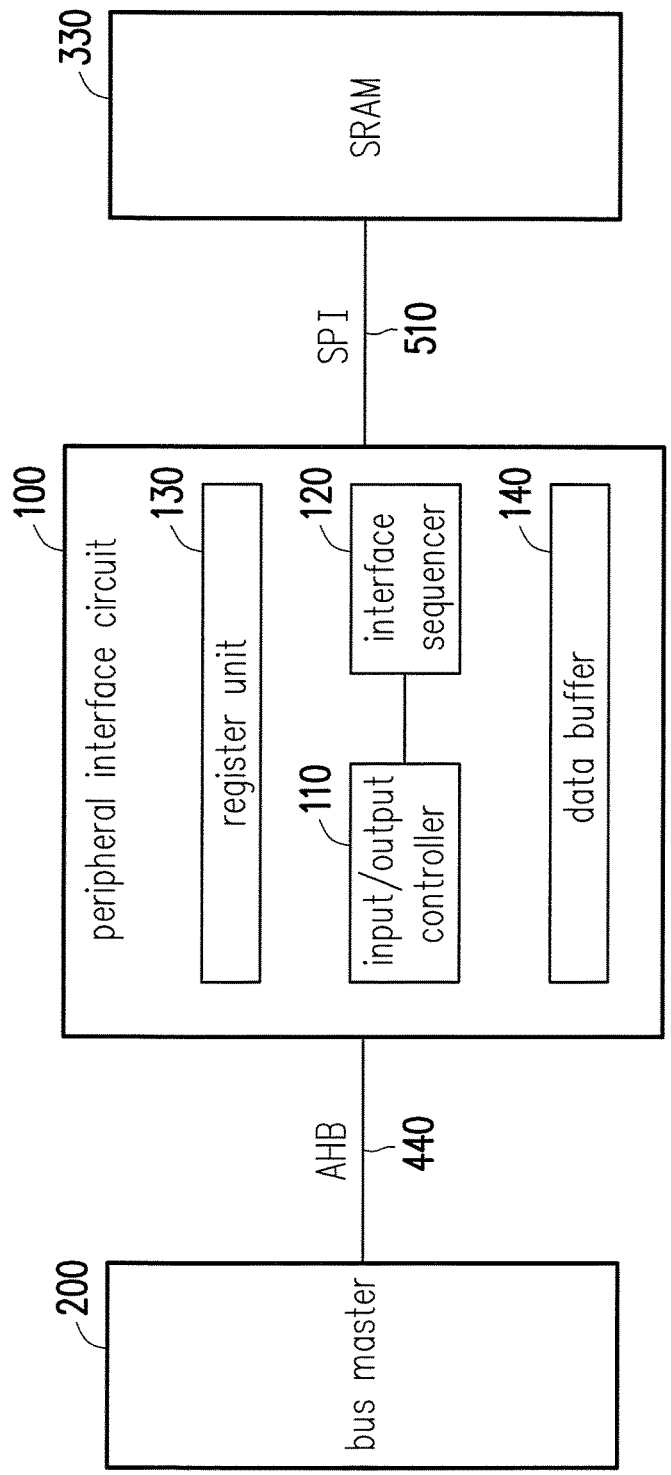
FIG. 8 is a block view illustrating a peripheral memory system according to an embodiment of the invention.

It should be noted that the invention is not limited to the embodiment shown in FIG. 3. The peripheral interface circuit 100 may be connected to the bus master 200 and the peripheral memory 300 through other types of bus interface and peripheral interface. FIG. 7 is a block view illustrating a peripheral memory system according to another embodiment of the invention. FIG. 8 is a block view illustrating a peripheral memory system according to another embodiment of the invention. In the following, only the differences between FIGS. 7 and 8 and FIG. 3 are described. Details about components of FIGS. 7 and 8 that are the same as those in FIG. 3 are not reiterated below.

For example, referring to FIG. 7, the input/output controller 110 is coupled to the bus master 200 through an APB bus 410 and a LMI (Local Memory Interface) bus 430. The input/output controller 110 is configured to receive register access requests through the APB bus 410 and data access requests through the LMI bus 430. The interface sequencer 120 is coupled to a EEPROM 320 through an I²C interface 520.

Another example is shown in FIG. 8. Referring to FIG. 8, the input/output controller 110 is coupled to the bus master 200 through an AHB bus 440. The input/output controller 110 is configured to receive register access requests and data access requests through the AHB bus 440. The input/output controller 110 may distinguish the type of requests by address. For example, a request with address between 0x0 and 0x0FFF is treated as a register access request while that with address between 0x100000 and 0x1FFFFF is treated as a data access request. The interface sequencer 120 is coupled to a SRAM 330 through a SPI interface 510.

It will be apparent that various modifications and variations can be made to the structure of the present invention without departing from the scope or spirit of the invention. In view of the foregoing, it is intended that the present invention covers modifications and variations of this invention provided they fall within the scope of the following claims and their equivalents.

What is claimed is:

1. A peripheral interface circuit, comprising:
   an interface sequencer, coupled to a peripheral memory through a peripheral interface;
   an input/output controller, coupled to a bus master through one or a plurality of bus interfaces;
   a register unit; and
   a data buffer,
   wherein the interface sequencer receives requests from the input/output controller and accesses the peripheral memory in response to the requests, wherein the input/output controller determines whether each of the received requests is a data access request or a register access request by determining whether type of the each of the requests is a data access type or a register access type,
   when the data access request is received from the bus master, the input/output controller determines whether target data corresponding to the data access request exist in the data buffer,
   when the register access request is received from the bus master, the input/output controller accesses a target register, in the register unit, corresponding to the register access request,
   wherein the data buffer is randomly accessed by address, if the target data of the data access request does not exist in the data buffer, the input/output controller sends an interface request to the interface sequencer to access the peripheral memory to receive the target data, and keeps a copy of at least the target data into the data buffer without moving other data stored in the data buffer, wherein the register unit controls a behavior of the peripheral interface circuit or reflect a status of the peripheral interface circuit, and the data buffer keeps the copy of one or more parts of the peripheral memory, wherein the bus master initiates requests to retrieve an identification code from the peripheral memory, wherein the bus master determines a type of the peripheral memory according to the identification code, and requests the interface sequencer to operate at a suitable transmission mode.

2. The peripheral interface circuit as claimed in claim 1, wherein the register unit comprises a plurality of registers.

3. The peripheral interface circuit as claimed in claim 2, wherein one register of the register unit serves as a command register, and the input/output controller sends an interface request to the interface sequencer when the command register is accessed.

4. The peripheral interface circuit as claimed in claim 2, wherein one or more registers of the register unit are mapped to the data buffer, and accessing the registers will access the data buffer actually.

5. The peripheral interface circuit as claimed in claim 1, if the target data of the data access request exists in the data buffer, the input/output controller returns data from the data buffer in response to the data access request without moving the other data stored in the data buffer.

6. The peripheral interface circuit as claimed in claim 1, wherein the data buffer comprises one or more sets of:
   a valid bit;
   a tag; and
   a data line,
   wherein the valid bit indicates whether data recorded in the corresponding data line is valid,
   the tag records part of the address representing the first data of the corresponding data line, and
   the data line records one or more data at continuous addresses of the peripheral memory.

7. The peripheral interface circuit as claimed in claim 1, wherein if the data access request is a data read request received by the input/output controller, the data buffer is implemented as an instruction cache.

8. The peripheral interface circuit as claimed in claim 1, wherein the input/output controller further receives data write requests from the bus master.

9. The peripheral interface circuit as claimed in claim 8, wherein the data buffer is implemented as a data cache.

10. A peripheral memory system, comprising:
    a peripheral interface circuit, comprising:
      an interface sequencer;
      an input/output controller;
      a register unit; and
      a data buffer,
    a bus master, coupled to the peripheral interface circuit through one or a plurality of bus interfaces; and
    a peripheral memory, coupled to the peripheral interface circuit through a peripheral interface,
    wherein the interface sequencer receives requests from the input/output controller and accesses the peripheral memory in response to the requests, the data buffer is randomly accessed by address, wherein the input/output controller determines whether each of the received requests is a data access request or a register access request by determining whether type of the each of the requests is a data access type or a register access type, when the data access request is received from the bus master, the input/output controller determines whether target data corresponding to the requests exist in the data buffer, when the register access request is received from the bus master, the input/output controller accesses a target register, in the register unit, corresponding to the register access request, if the target data of the data access request does not exist in the data buffer, the input/output controller sends an interface request to the interface sequencer to access the peripheral memory to receive the target data, and keeps a copy of at least the target data into the data buffer without moving other data stored in the data buffer, wherein the register unit controls a behavior of the peripheral interface circuit or reflect a status of the peripheral interface circuit, and the data buffer keeps the copy of one or more parts of the peripheral memory, wherein the bus master initiates requests to retrieve an identification code from the peripheral memory, wherein the bus master determines a type of the peripheral memory according to the identification code, and requests the interface sequencer to operate at a suitable transmission mode.

11. The peripheral memory system as claimed in claim 10, wherein the register unit comprises a plurality of registers.

12. The peripheral memory system as claimed in claim 11, wherein one register of the register unit serves as a command register, and the input/output controller sends an interface request to the interface sequencer when the command register is accessed.

13. The peripheral memory system as claimed in claim 11, wherein one or more registers of the register unit are mapped to the data buffer, and accessing the registers will access the data buffer actually.

14. The peripheral memory system as claimed in claim 10, if the target data of the data access request exists in the data buffer, the input/output controller returns data from the data buffer in response to the data access request without moving the other data stored in the data buffer.

15. The peripheral memory system as claimed in claim 10, wherein the data buffer comprises one or more sets of:
    a valid bit;
    a tag; and
    a data line,
    wherein the valid bit indicates whether data recorded in the corresponding data line is valid,
    the tag records part of the address representing the first data of the corresponding data line, and
    the data line records one or more data at continuous addresses of the peripheral memory.

16. The peripheral memory system as claimed in claim 10, wherein if the data access request is a data read request received by the input/output controller, the data buffer is implemented as an instruction cache.

17. The peripheral memory system as claimed in claim 10, wherein the input/output controller further receives data write requests from the bus master.

18. The peripheral memory system as claimed in claim 17, wherein the data buffer is implemented as a data cache.

\* \* \* \* \*